(12) United States Patent
Douglas

(10) Patent No.: US 6,267,197 B1
(45) Date of Patent: Jul. 31, 2001

(54) AXLE SHAFT SPACER MEMBER

(75) Inventor: Scott W. Douglas, El Cajon, CA (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/415,406

(22) Filed: Oct. 8, 1999

Related U.S. Application Data

(60) Provisional application No. 60/106,318, filed on Oct. 30, 1998.

(51) Int. Cl.[7] ..................................................... B60K 17/26
(52) U.S. Cl. ........................ 180/383; 180/348; 180/359; 180/353; 280/788; 280/124.135; 280/124.136
(58) Field of Search ..................................... 180/348, 359, 180/353, 383, 906; 280/788, 124.135, 124.136, 42; 464/92, 98

(56) References Cited

U.S. PATENT DOCUMENTS

| | | | |
|---|---|---|---|
| 4,773,889 | * | 9/1988 | Rosenwinkel et al. ............... 446/448 |
| 5,326,128 | * | 7/1994 | Cromley ................................. 280/656 |
| 5,868,624 | * | 2/1999 | Fukushima et al. ..................... 464/98 |
| 5,899,813 | * | 5/1999 | Bunce ...................................... 464/99 |
| 5,938,533 | * | 8/1999 | Watanabe ................................ 464/98 |

FOREIGN PATENT DOCUMENTS

9317847 * 12/1997 (JP) ............................................ 41/24

OTHER PUBLICATIONS

Rancho Catalog, 1998, pp. 4 and 8.*
Shandley, Rick, "Suspension Guide: . . . ", Off Road, v31, n6, p. 38.*

* cited by examiner

Primary Examiner—Lanna Mai
Assistant Examiner—Christopher Buchanan
(74) Attorney, Agent, or Firm—Harness, Dickey & Pierce, PLC

(57) ABSTRACT

An axle shaft spacer member for use with a suspension lift kit. The spacer member enables the wheel spindle of a vehicle to be moved laterally a desired distance, which in turn enables the upper control arms associated with the wheel spindle to be lowered when such would not otherwise be possible because of interference with the frame portion of the vehicle. The spacer is a disc-like member having a thickness equal to the desired lateral offset distance needed to enable the upper control arm to be lowered and re-mounted via a drop bracket, to the frame. The spacer member enables the original suspension geometry to be maintained, thus maintaining the ride and steering characteristics of the original suspension system while enabling vehicle ride height to be increased.

9 Claims, 6 Drawing Sheets

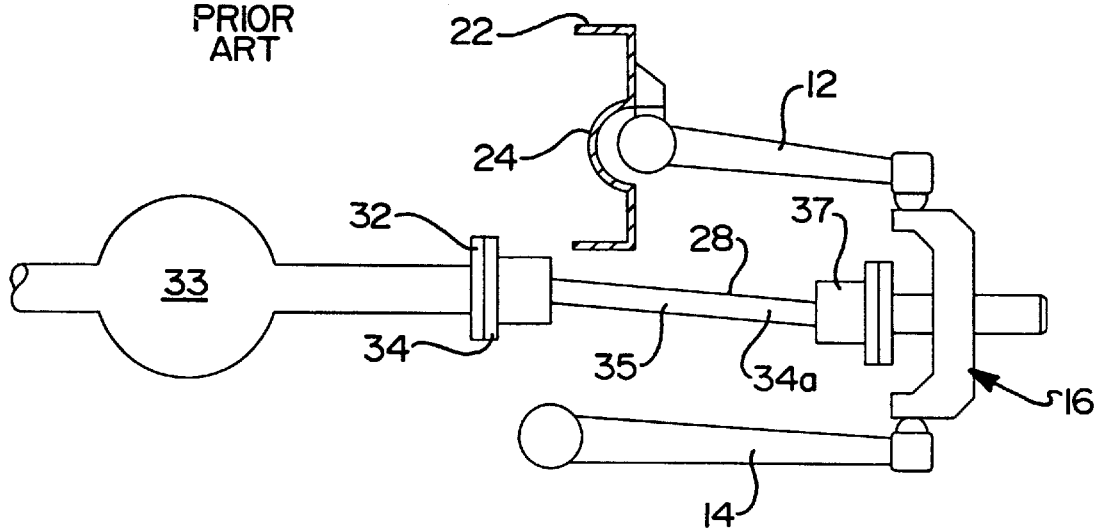
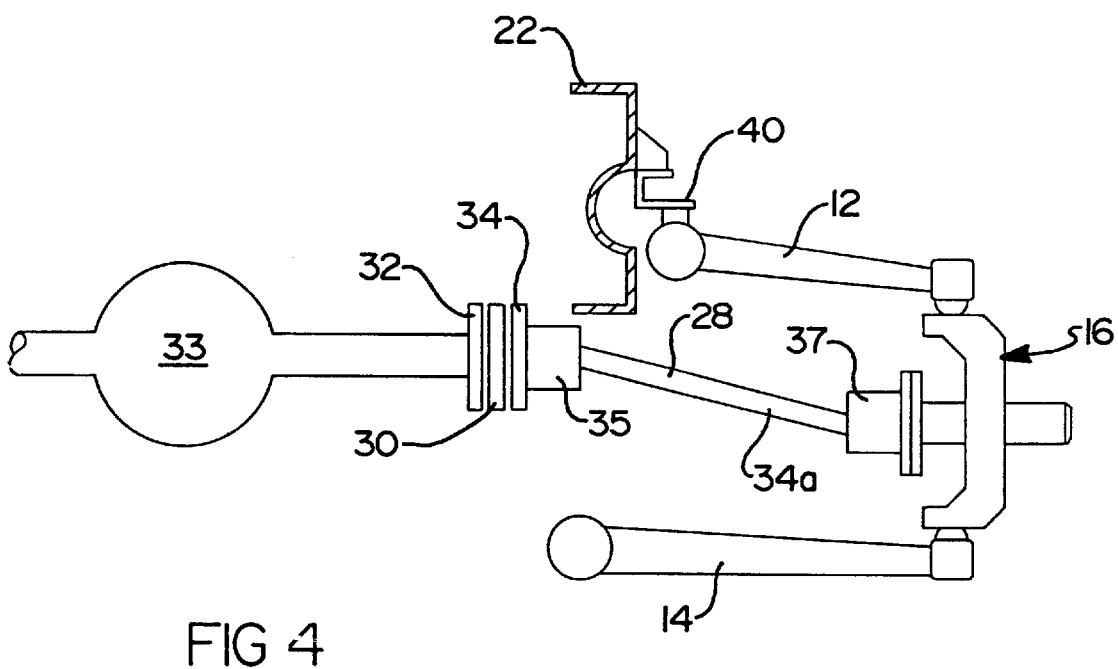

AXLE SHAFT SPACER MEMBER

This application claims benefit provision Application Ser. No. 60/106318 filed Oct. 30, 1998.

TECHNICAL FIELD

This invention relates to vehicle suspension systems, and more particularly to an axle shaft spacer member for moving a wheel of a vehicle outwardly a slight amount to enable the upper control arms of the vehicle to be lowered using otherwise conventional lift kit components, to thereby achieve a desired degree of lift of the vehicle.

BACKGROUND

It has become desirable with many owners of trucks and sport utility vehicles to employ a "lift kit" to increase the ride height of the vehicle. This typically requires the upper and lower control arms to be re-mounted at a lower position than with the original equipment manufacturer (OEM) suspension system. This is typically accomplished through the use of "drop" brackets to which the control arms are secured. Portions of the brackets are then secured at the original mounting locations of the upper and lower control arms, and the brackets thereby serve to lower all of the control arms. Other replacement components such as coil springs and shock absorbers are also often included in such lift kits, and the lift kit project is one which an individual with some mechanical aptitude and experience can do by himself.

When attempting to re-mount the upper control arms at a lower position, the construction of the vehicle frame often impedes or makes impossible the task of simply lowering the upper control arms by using the drop brackets as intermediate members between the frame and the upper control arms. In this instance, to increase the vehicle ride height would require upper control arms having lengths which are shorter than the OEM control arms or possibly require other extensive suspension modifications. Obviously, replacing the upper control arms with ones which are of an altered length would add significantly to the cost of the lift kit, the complexity of the kit, the time required to install the kit and may sacrifice the intended suspension geometry.

When faced with a situation where the vehicle frame will not permit the upper control arms to be dropped straight down and remounted at a lower position relative to the frame, moving the entire wheel spindle outwardly slightly would become a solution to the clearance problem. By moving the wheel spindle outwardly a small distance, for example, about 0.5 inch, which represents that distance which the upper control arm has to be offset laterally from its OEM mounting location before it can be lowered with a drop bracket, the OEM upper control arms and wheel spindles could be used. This slight degree of outward displacement of the entire wheel spindle would therefore enable convention drop brackets to be used and mounted to the vehicle frame such that the OEM upper control arms would not encounter interference from the frame. By simply moving the entire above-mentioned assembly as described would sacrifice the intended engagement of the outboard CV joint. This may lead to a premature failure or reduced performance of the CV joint.

It is therefore a principal object of the present invention to provide a lift kit which enables the ride height of a vehicle to be increased in instances where it is not possible to simply lower the upper control arms because of interference with the vehicle frame.

It is further an object of the present invention to provide a spacer member which is adapted to move the entire wheel spindle of the vehicle outwardly such that the upper control arms can be lowered, as well as laterally displaced a required amount, and still maintain the intended function and service of the CV joint.

It is further an object of the present invention to provide an axle spacer member which serves to permit the wheel spindle with which it is associated to be moved outwardly a distance approximately equal to the distance by which the upper control arms have to be laterally displaced to overcome the interference from the frame. This would enable the OEM upper control arms to be used without modification, and simply remounted to the frame at the desired vertical position to achieve the desired degree of lift.

SUMMARY OF THE INVENTION

The present invention is directed to an axle shaft spacer member which serves to move the entire wheel spindle assembly with which it is associated outwardly a desired distance equal to that distance by which the upper control arms have to be moved outwardly to overcome interference from the frame of the vehicle. The spacer comprises a disc-like element which is adapted to be secured between the OEM differential end flange and the stub axle flange end at each wheel of the vehicle. The thickness of the spacer member is approximately equal to that distance by which the wheel spindle needs to be moved outwardly to accommodate the lateral displacement of the upper control arms required before same can be lowered with a drop bracket.

Each spacer member includes a plurality of apertures formed in a pattern which conforms to the pattern of apertures in the stub axle flange. In this manner the spacer member can be coupled in between the differential end flange and the stub axle flange without requiring the user to drill precisely positioned holes in the spacer member. The spacer member serves to laterally displace the entire wheel spindle with which it is associated outwardly the desired distance needed so that the upper control arm can be re-mounted to the frame via a drop bracket.

It is anticipated that the spacer member will in most instances form an important part of a complete lift kit for a specific vehicle, where the frame of the specific vehicle does not permit the upper control arms of the vehicle to be simply lowered with conventional drop brackets.

BRIEF DESCRIPTION OF THE DRAWINGS

The various advantages of the present invention will become apparent to one skilled in the art by reading the following specification and subjoined claims and by referencing the following drawings in which:

FIG. 3 is a simplified schematic view of the OEM configuration for supporting the upper control arm;

FIG. 4 is a simplified schematic diagram of the spacer member of the present invention intercoupled between the differential end flange and the axle stub end flange, and illustrating in simplified fashion from a side view the mounting arrangement shown in FIGS. 1 and 2;

DETAILED DESCRIPTION OF THE PREFERRED EMBODIMENTS

Figure 1:
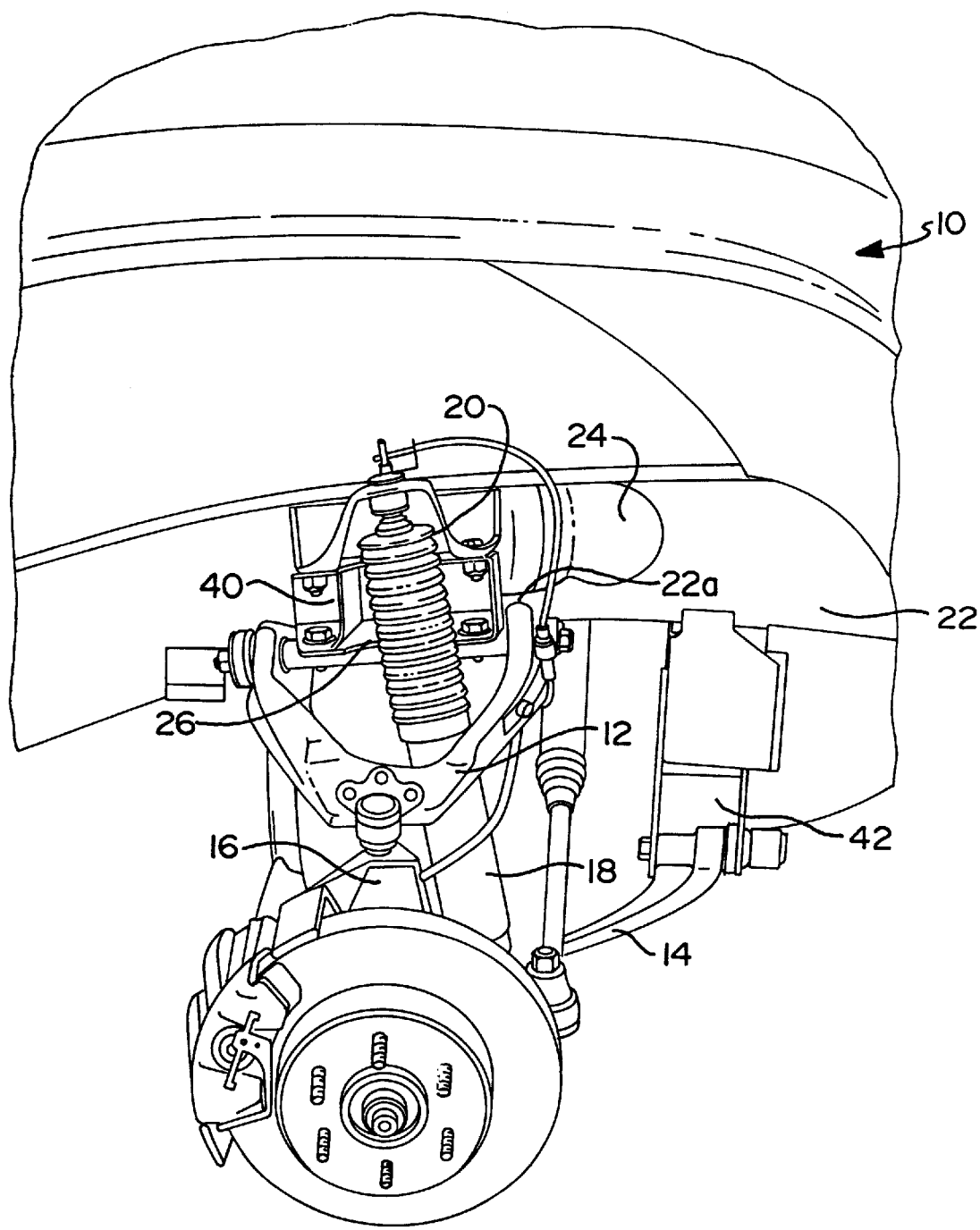
FIG. 1 is a perspective illustration of a portion of the suspension assembly at one of the front wheels of a vehicle without the wheel attached to the wheel spindle.

Referring to FIG. 1, there is shown an illustration of a portion of a suspension system for a vehicle 10. The suspension system generally includes an upper control arm 12, a lower control arm 14, and a wheel spindle 16 supported by the control arms 12 and 14. A shock absorber 18 is mounted to the wheel spindle and to a shock tower 20 to damp motion of the wheel spindle 16, as is well understood in the art.

A frame portion 22 supports the shock tower 20. The frame portion 22 can be seen to include a "pocket" or recessed area 24. Normally mounted in this recessed area 24 is a pivot shaft 26 which supports portions of the upper control arm for pivotal movement relative to the frame 22. The recessed area 24 thus provides the clearance necessary to enable proper pivotal movement of the upper control arm 12.

As will be appreciated, when attempting to lower the upper control arm 12 through the use of a lift kit, this pivot shaft 26 would normally be lowered straight down via a drop bracket. The shaft 26 would then be secured to spaced apart portions of the drop bracket such that the lateral orientation of the bracket is not altered, only the vertical orientation is altered. The amount of vertical distance by which the pivot shaft 26 is altered represents the amount of increased lift to the body of the vehicle 10.

Figure 2:
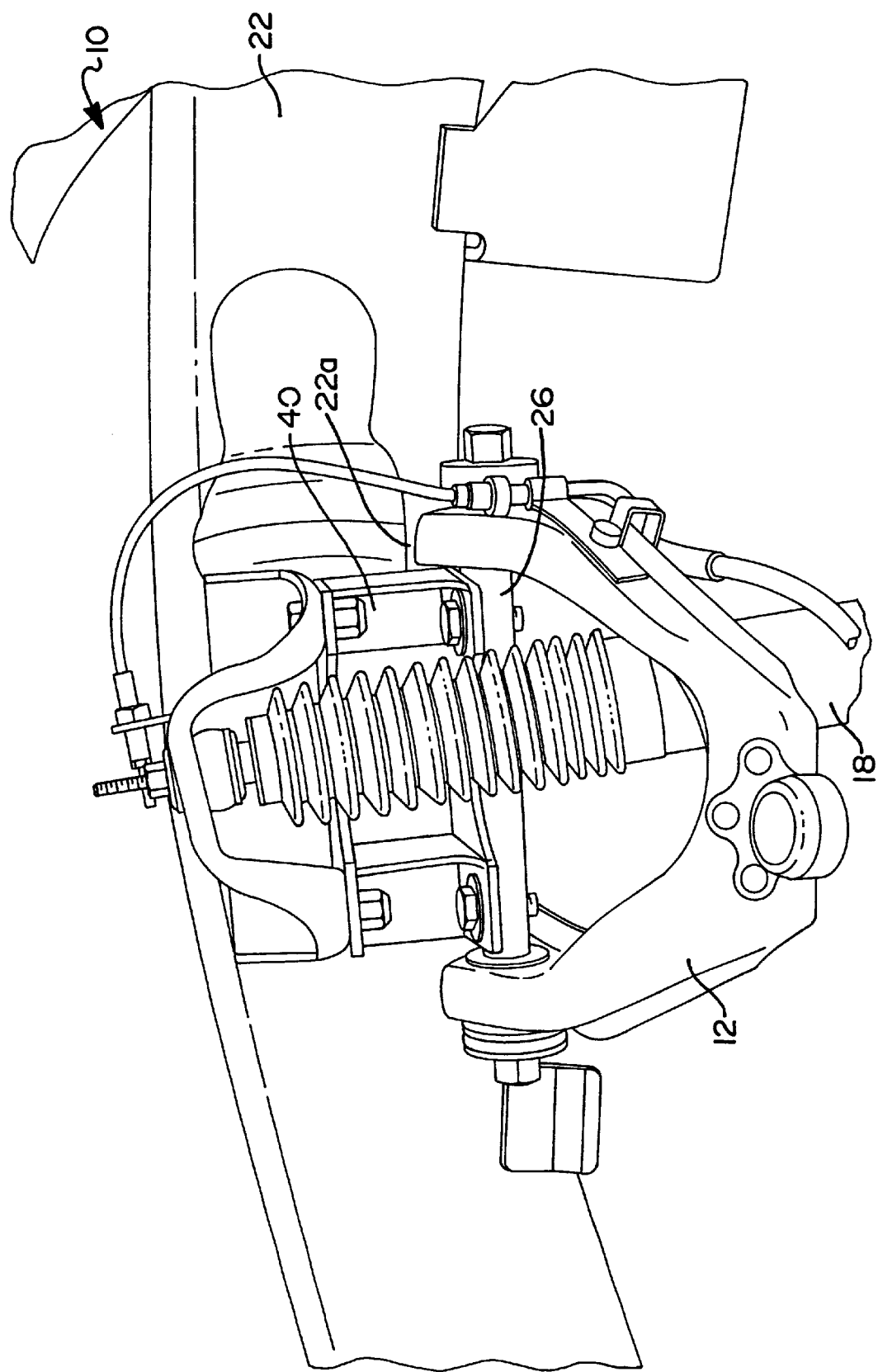
FIG. 2 is an enlarged view of the frame portion of the vehicle shown in FIG. 1 even better illustrating the area of the frame forming a recess within which the pivot shaft of the upper control arm would normally be mounted, and would thus normally prevent the pivot shaft from being lowered straight down by a drop bracket.

As can be even better seen in the illustration of FIG. 2, since the pivot shaft 26 and portions of the upper control arm 12 are intended (in the OEM configuration) to be disposed in the recessed area 24, it would not be possible to simply lower the pivot shaft 26, and thus the entire upper control arm 12, straight down because of interference with the frame portion 22a of the vehicle. Thus, it is necessary to displace the pivot shaft 26, and therefore the entire upper control arm 12, laterally such that the pivot shaft 26 and upper control arm 12 clear the frame portion 22a.

This problem is illustrated in simplified form in FIG. 3. In FIG. 3, it can be seen that the pivot shaft 26 cannot simply be lowered without moving the entire upper control arm laterally. Simply lowering the entire upper control arm 12 and displacing it laterally, without other modifications to the suspension system, would seriously adversely affect the ride, steering and stability of the vehicle 10. Such a modification of the positioning of the upper control arm 12 would upset the carefully designed geometry of the suspension system. Therefore, unless the wheel spindle 16 is modified, it becomes necessary to also modify the axle shaft 28 such that the OEM suspension geometry is not upset.

Referring to FIG. 4, a simplified view of an axle spacer member 30 in accordance with a preferred embodiment of the present invention is shown. This spacer member 30 is coupled in between the differential end flange 32 of a differential 33 and the axle stub end flange 34 of an axle shaft 34a. A first CV joint 35 and a second CV joint 37 support the axle shaft 34a. The spacer member 30 effectively laterally displaces the entire lower control arm to the right in the drawing of FIG. 4 by a desired distance. In one preferred embodiment this distance is about 0.5 inch, which represents the lateral distance by which the upper control arm 12 needs to be laterally displaced so as to not encounter interference from the frame 22. It will be appreciated, however, that the thickness of the spacer member 30 can be varied during manufacture thereof to provide a different lateral offset as may be needed to meet the requirements of a specific vehicle.

Figure 5:
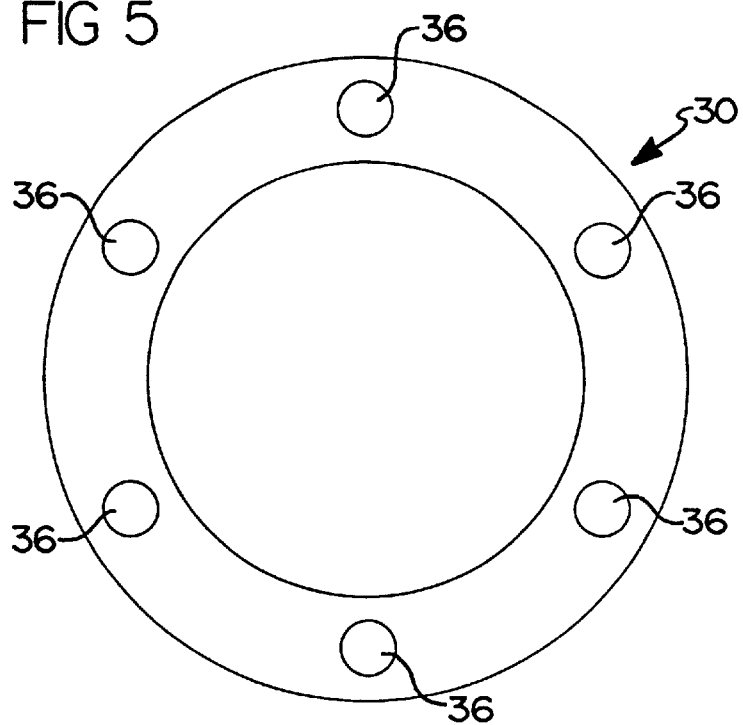
FIG. 5 is a plan view of the spacer member of the present invention.
Figure 6:
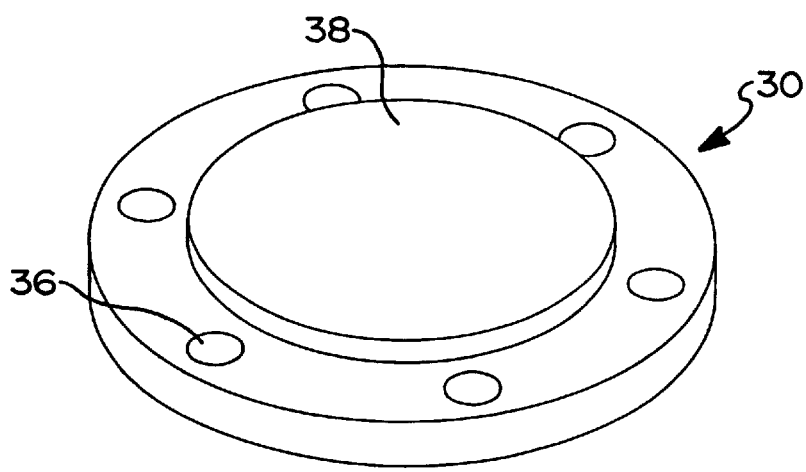
FIG. 6 is a perspective view of the spacer of FIG. 1.

Referring now to FIGS. 5 and 6, the spacer member 30 is shown in greater detail. The spacer member 30 includes a plurality of apertures 36 in a generally circumferential pattern. The apertures 36 are arranged to align with the openings in the axle stub end flange 32 such that the spacer member can be coupled between the differential end flange 32 and the axle stub end flange 34 without modification to either of these flanges. It will be appreciated, however, that longer bolts will be required for intercoupling this assembly together in view of the 0.5 inch thickness of the spacer member 30. It will also be appreciated that the spacing between apertures 36, as well as the number of apertures, can be varied during manufacture of the member 30 to match a specific OEM flange configuration used on a particular vehicle.

Figure 7:
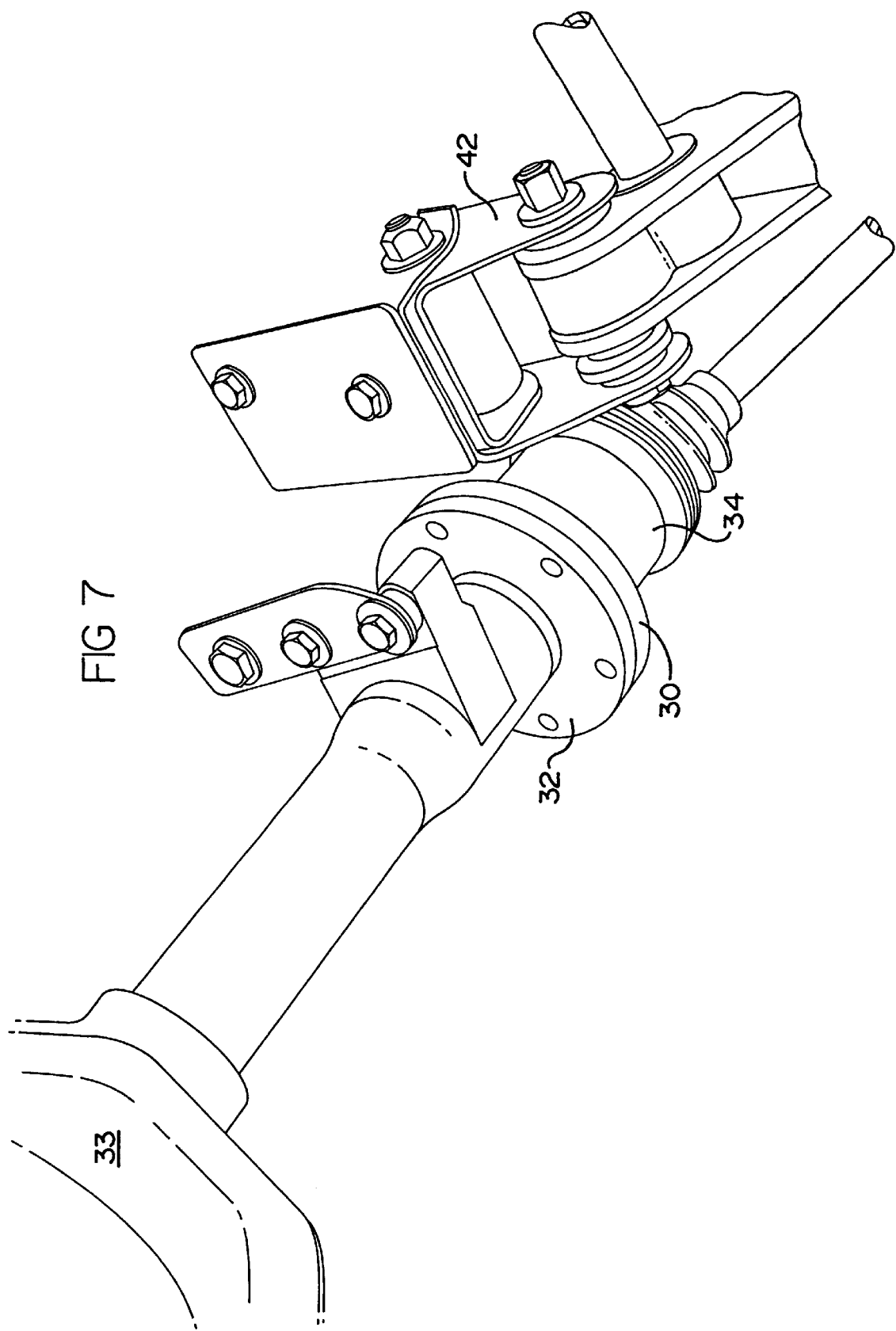
FIG. 7 is a perspective view of a portion of a suspension system for a vehicle showing the spacer member intercoupled between the OEM differential end flange and the stub axle flange end.
Figure 8:
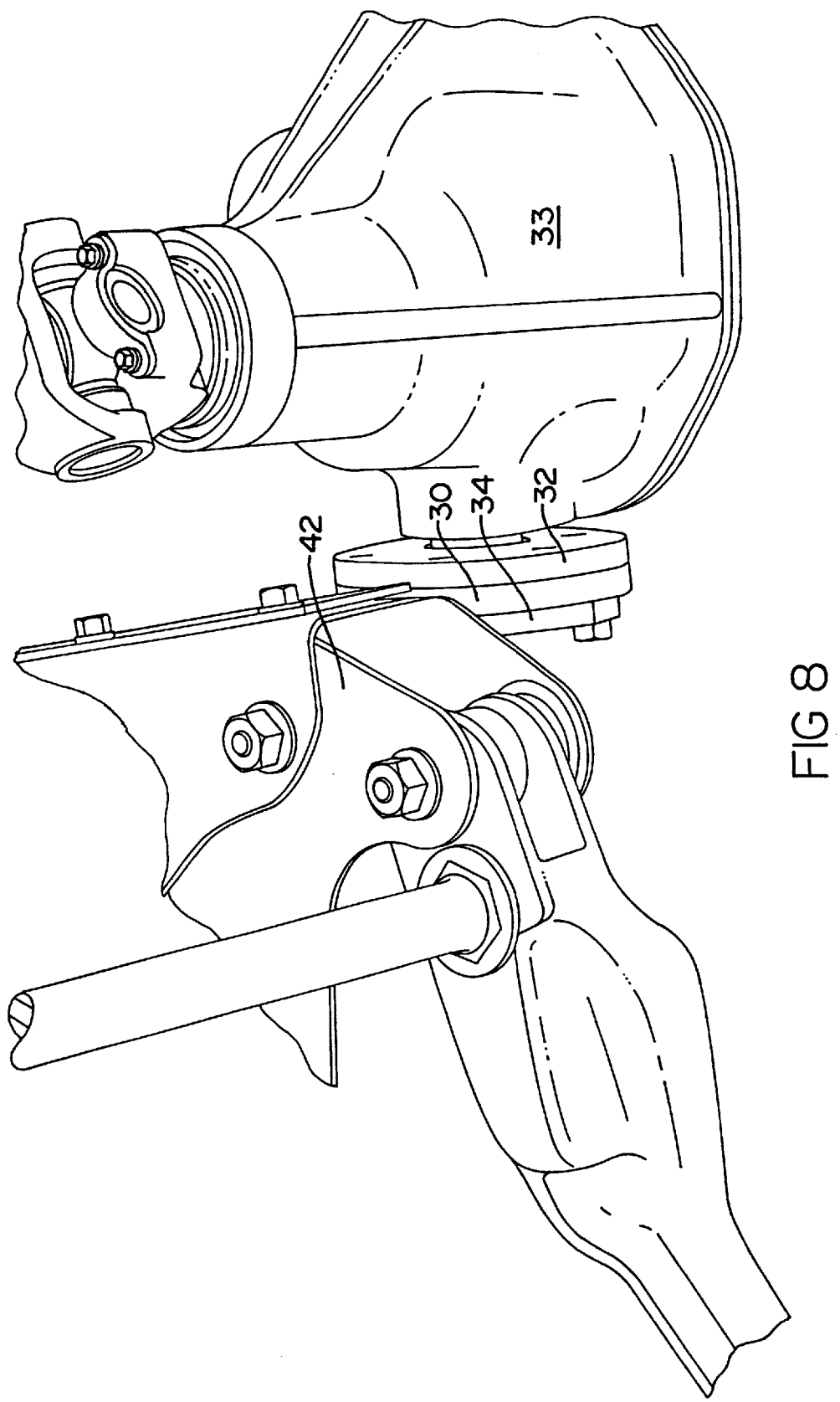
FIG. 8 is another perspective view illustrating the intercoupling of the axle spacer member between the differential end flange and the stub axle flange end.

The spacer member 30 also includes a raised portion 38 as can be seen in FIG. 6. The raised portion 38 helps to center the member 30 between components 32 and 34 during assembly. The spacer is preferably made from aluminum but could be made from other suitably strong materials as well. The spacer is shown assembled to components 32 and 34 in FIGS. 7 and 8.

With further brief reference to FIG. 1, the spacer 30 enables an upper control arm drop bracket 40 (also shown in FIG. 4) to be used to re-mount the upper control arm 12. A pair of lower control arm drop brackets 42 (only one being visible in FIG. 1) are then used in conventional fashion to remount the lower control arms.

It will thus be appreciated that the spacer member 30 forms a means by which the entire wheel spindle assembly 16 can be moved laterally a desired distance to enable its associated upper control arm 12 to be lowered without interference from the frame 22 of the vehicle 10. In this manner the upper and lower control arms 12 and 14, respectively, can be lowered relative to the frame 22 without affecting the ride and steering of the vehicle. The spacer member 30 can be readily modified during manufacture to meet the requirements of specific vehicles.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A combination of a motor vehicle and a suspension system including a suspension modification system for allowing a ride height of said motor vehicle to be increased without adversely affecting the performance or geometry of said suspension system, said suspension modification system comprising:

a drop bracket coupled to a frame portion of said motor vehicle and to an upper terminal end of an upper control arm to effectively lower a height at which said upper control arm is disposed relative to said frame portion, and further to laterally displace an upper end of said upper control arm a predetermined lateral distance; and an axle shaft spacer secured to a driven end of an axle of said vehicle associated with said upper control arm and to a driving portion of a differential of said vehicle;

whereby said axle shaft spacer transfers driving force between said driving portion and said driven end and laterally displaces said axle by a distance in accordance with said predetermined lateral distance.

2. The suspension modification system of claim 1, wherein said axle shaft spacer comprises a disc-like spacer member adapted to be secured between a differential end flange of said differential and a continuously variable (CV) joint operably associated with said axle.

3. The suspension modification system of claim 1, wherein said axle shaft spacer comprises a disc-like spacer member having a plurality of circumferentially arranged apertures adapted to align with openings in an axle stub end flange of a continuously variable (CV) joint associated with said axle.

4. The suspension modification system of claim 1, wherein said axle shaft spacer is comprised of aluminum.

5. A combination of a motor vehicle and a factory installed suspension system including a suspension modification system for allowing a ride height of said motor vehicle to be increased without adversely affecting the performance or geometry of said factory installed suspension system, said suspension modification system comprising:

a drop bracket coupled to a frame portion of said vehicle and to an upper terminal end of an upper control arm to effectively lower a height at which said upper control arm is disposed relative to said frame portion, and further to laterally displace an upper end of said upper control arm a predetermined lateral distance; and a disc-like axle shaft spacer member secured to a driven end of a stub end flange of a continuously variable (CV) joint associated with an axle of said vehicle, wherein said axle is associated with said upper control arm, and to a driving end flange of a differential of said vehicle, without modification to said stub end flange or said end flange of said differential;

whereby said axle shaft spacer member transfers driving force between said driving end and said driven end and laterally displaces said axle by a distance in accordance with said predetermined lateral distance to thereby maintain the geometry of said suspension system of said vehicle in accordance with said factory installed suspension system.

6. The suspension modification system of claim 5, wherein said axle shaft spacer member comprises an aluminum disc-like member having a plurality of circumferentially arranged apertures adapted to align with circumferential apertures in one of said stub end flange or said end flange of said differential, to enable said spacer member to be secured therebetween by a corresponding plurality of fastening members.

7. The suspension modification system of claim 6, wherein said axle shaft spacer member comprises a raised circumferential portion for assisting in locating said member between said stub end flange and said end flange of said differential.

8. The suspension modification system of claim 7, wherein said plurality of circumferentially arranged apertures circumscribe said raised circumferential portion.

9. A method for enabling a ride height of a vehicle to be increased without significant modifications to a factory installed suspension system of said vehicle, and without adversely affecting the geometry and handling provided by said suspension system, said method comprising the steps of:

mounting a drop bracket to a frame portion of a vehicle adjacent an upper control arm of said suspension system, said drop bracket being coupled to an upper end of said upper control arm to lower said upper end a predetermined distance and to laterally displace said upper end a predetermined lateral distance outwardly of said frame portion; and mounting an axle shaft spacer member to a driving portion of a differential of said vehicle and to a driven end of an axle associated with said upper control arm, said spacer member transferring driving force between said driving portion and said driven end and effectively displacing said axle by a lateral distance in accordance with said predetermined lateral distance, such that a wheel spindle coupled to said upper control arm and to said axle is effectively lowered by said predetermined distance and moved laterally by said predetermined lateral distance.

\* \* \* \* \*